United States Patent
Kawamoto

(10) Patent No.: US 7,704,569 B2
(45) Date of Patent: Apr. 27, 2010

(54) METHOD FOR PRODUCING FILM WITH TWISTED TILTED ALIGNMENT, FILM WITH TWISTED TILTED ALIGNMENT, AND IMAGE DISPLAY USING SAME

(75) Inventor: Ikuo Kawamoto, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 402 days.

(21) Appl. No.: 10/548,223

(22) PCT Filed: Mar. 5, 2004

(86) PCT No.: PCT/JP2004/002798

§ 371 (c)(1),
(2), (4) Date: Sep. 2, 2005

(87) PCT Pub. No.: WO2004/079416

PCT Pub. Date: Sep. 16, 2004

(65) Prior Publication Data

US 2006/0170851 A1    Aug. 3, 2006

(30) Foreign Application Priority Data

Mar. 6, 2003   (JP)   ............... 2003-060540
Mar. 3, 2004   (JP)   ............... 2004-058943

(51) Int. Cl.
  *G02F 1/13363*   (2006.01)
  *G02F 1/1337*    (2006.01)
(52) U.S. Cl. .............. 428/1.3; 428/1.21; 428/1.23; 349/123; 427/162
(58) Field of Classification Search ......... 428/1.2–1.28; 252/299.01, 299.4; 349/117, 115, 123–124, 349/126; 427/162, 164, 167
See application file for complete search history.

(56) References Cited

U.S. PATENT DOCUMENTS

| | | | | |
|---|---|---|---|---|
| 3,158,505 A | * | 11/1964 | Sandor | 428/336 |
| 4,370,028 A | * | 1/1983 | Bernhardt | 349/124 |
| 4,433,900 A | * | 2/1984 | Sekimura | 349/130 |
| 4,472,027 A | * | 9/1984 | Okubo et al. | 349/131 |
| 4,472,028 A | * | 9/1984 | Ooue et al. | 349/131 |
| 5,250,214 A | * | 10/1993 | Kanemoto et al. | 252/299.01 |
| 5,413,657 A | * | 5/1995 | Yamanashi et al. | 156/235 |
| 5,766,673 A | * | 6/1998 | Nogami et al. | 427/58 |

(Continued)

FOREIGN PATENT DOCUMENTS

JP     06-250166 A     9/1994

(Continued)

OTHER PUBLICATIONS

Office Action of Corresponding Chinese Patent Application No. 200480006090.X issued Jun. 8, 2007.

*Primary Examiner*—Sophie Hon
(74) *Attorney, Agent, or Firm*—Westerman, Hattori, Daniels & Adrian, LLP

(57) ABSTRACT

A twist-obliquely oriented liquid crystal layer and a twist-obliquely oriented film is formed by forming an alignment layer, on a substrate, containing at least one selected from a glassy macromolecule and a silane coupling agent, performing a rubbing treatment on the alignment layer, and then applying a liquid crystal coating solution containing a chiral agent and a photopolymerizable liquid crystal composition.

11 Claims, 1 Drawing Sheet

U.S. PATENT DOCUMENTS

| | | |
|---|---|---|
| 5,853,801 A | 12/1998 | Suga et al. |
| 6,096,241 A * | 8/2000 | Coates et al. ......... 252/299.01 |
| 6,320,635 B1 | 11/2001 | Matsui |
| 6,392,624 B1 | 5/2002 | Yang et al. |
| 7,388,637 B2 * | 6/2008 | Kawamoto et al. .......... 349/123 |
| 2003/0039770 A1* | 2/2003 | Sato et al. .................... 428/1.3 |
| 2003/0218708 A1* | 11/2003 | Ichihashi .................... 349/115 |
| 2003/0218715 A1* | 11/2003 | Okawa et al. ............... 349/194 |
| 2005/0129876 A1* | 6/2005 | Kiyohara et al. ............. 428/1.2 |

FOREIGN PATENT DOCUMENTS

| | | |
|---|---|---|
| JP | 7-140326 A | 6/1995 |
| JP | 08-005838 A | 1/1996 |
| JP | 09-073016 A | 3/1997 |
| JP | 09-178937 A | 7/1997 |
| JP | 9-288210 A | 11/1997 |
| JP | 09-325212 A | 12/1997 |
| JP | 10-253963 A | 9/1998 |
| JP | 2000-327720 A | 11/2000 |
| JP | 2001-100035 A | 4/2001 |
| JP | 2002-031714 A | 1/2002 |
| JP | 2002-214431 A | 7/2002 |
| JP | 2002-214610 A | 7/2002 |
| JP | 2002-311426 A | 10/2002 |
| JP | 2008-216587 A | 9/2008 |

* cited by examiner

METHOD FOR PRODUCING FILM WITH TWISTED TILTED ALIGNMENT, FILM WITH TWISTED TILTED ALIGNMENT, AND IMAGE DISPLAY USING SAME

This application is a 371 of PCT/JP04/02798 filed Mar. 5, 2004.

FIELD OF THE INVENTION

The present invention relates to a method for producing a twist-obliquely oriented film having a twist-obliquely oriented liquid crystal layer, a twist-obliquely oriented film or a twist-obliquely oriented liquid crystal layer. A twist-obliquely oriented film produced by the production method according to the invention or a twist-obliquely oriented liquid crystal layer obtained by separating a substrate and an alignment layer from the twist-obliquely oriented film can be used singly or in combination with another film. For example, the film or layer can be used in the form of an optical compensating film such as a retardation film or a viewing angle compensating film or in the form of an optical film such as an elliptically polarizing film obtained by sticking a polarizing plate to the optical compensating film. These films can be used in image display devices such as liquid crystal display devices (LCD), electroluminescence display devices (ELD), plasma displays (PD) and field emission displays (FED). Particularly the twist-obliquely oriented film according to the invention is effective in optically compensating the LCD.

BACKGROUND ART

An LCD can display an image by using various methods of controlling light emitted from a backlight unit. For example, an optical compensating film is used for improving color display reproducibility and viewing angle characteristic. The optical compensating film is provided so that the retardation of the film is controlled by stretching a polymer film or coating the film with an organic material to make optical compensation possible in accordance with various demands.

For example, an LCD provided with a liquid crystal panel having a liquid crystal operating mode of a TN mode or an STN mode uses various viewing angle widening techniques to compensate for the narrow viewing angle peculiar to the mode. For example, there are known a method using an alignment dividing means, a half-tone means or the like for averaging pixels while separating the pixels into a plurality of regions having different directions of liquid crystal molecular alignment, a method using a convergent lens or a divergent lens, a method using a viewing angle compensating film, and a method of radically improving the liquid crystal operating mode such as IPS, MVA or OCB. Among these methods, the method of improving the liquid crystal operating mode and the method using a viewing angle compensating film are simpler and have been aggressively put into practice.

Especially, the method using a viewing angle compensating film is simpler than the method of changing and improving the liquid crystal operating mode, because an optical compensating film integrated with a polarizing plate can be stuck to a liquid crystal panel without any change of the liquid crystal panel. That is, this method is a technique by which widening of the viewing angle can be achieved at low cost. A film having oblique discotic liquid crystal inclined or a film having oblique rod-like nematic liquid crystal is known as the viewing angle compensating film. In either case, a liquid crystal polymer is obliquely oriented (e.g. see Patent Document 1). There are also known an obliquely oriented film using a side chain-type liquid crystal polymer (e.g. see Patent Document 2) and a method using an optically oriented film as a nematic polymerizable liquid crystal compound exhibiting homeotropic (perpendicular) orientation to form an obliquely oriented liquid crystal layer (e.g. see Patent Document 3).

However, in the optical compensating film using such an obliquely oriented liquid crystal, optical axes caused by the refractive index anisotropy of the obliquely oriented liquid crystal are formed along the directions of orientation and obliquity of the liquid crystal. There is a problem that the look of an image display device to which the optical compensating film is applied varies according to upper, lower and left and right directions when the image display device is viewed obliquely with respect to the direction of a line normal to its display screen.

Moreover, in the optical compensating film used heretofore and made of a stretched film, an optical axis is decided by vertical stretching in a direction of 0° or horizontal stretching in a direction of 90° with respect to the flowing direction of a long-scale film. Also in the optical compensating film obtained by orientation of liquid crystal, an optical axis is decided by the rubbing or applying direction thereof. For this reason, when the optical compensating film is applied, for example, to a liquid crystal display device, the angle of the optical axis must be designed in accordance with the polarizing plate or the liquid crystal panel. It is however impossible to stick the optical compensating film to the polarizing plate or the liquid crystal panel at a desired angle in the condition that the optical compensating film is a continuous long-scale film. Accordingly, the optical compensating film must be stuck to the polarizing plate or the liquid crystal panel after it is punched into a rectangular shape in accordance with the angle. For this reason, there is apprehension about a problem of contamination with alien matter, breaking, etc. at the time of punching or under shipment and a lowering of production efficiency caused by mistaken sticking.

Patent Document 1: JP 8-5838 A
Patent Document 2: JP 2000-327720 A
Patent Document 3: JP 2002-214610 A

DISCLOSURE OF THE INVENTION

Therefore, an object of the present invention is to eliminate display differences between upper, lower, left and right oblique viewing directions of an image display device, that is, to provide a liquid crystal film not only oriented obliquely but also twisted spirally, that is, a so-called twist-obliquely oriented film. Accordingly, an object of the invention is to provide a method for producing a twist-obliquely oriented film, a twist-obliquely oriented film and a twist-obliquely oriented liquid crystal layer and to provide an optical film combined with the same and an image display device. Moreover, because the twist-obliquely oriented film can be obtained efficiently, the axial angle of the optical axis can be adjusted easily, so that continuous integrated production can be made in the condition that the twist-obliquely oriented film is a long-scale film.

The present inventors have made repeated examination eagerly to solve the aforementioned problem. As a result, the present inventors have found that the foregoing object can be achieved by the following method. Thus, the present invention is accomplished.

That is, the invention is A method for producing a twist-obliquely oriented film, comprising: forming an alignment layer, on a substrate, containing at least one selected from a glassy macromolecule and a silane coupling agent; performing a rubbing treatment on the alignment layer; and applying a liquid crystal coating solution containing a chiral agent and a photopolymerizable liquid crystal composition on the substrate so as to form a twist-obliquely oriented liquid crystal layer having a twist-obliquely oriented liquid crystal layer spirally twisted nematic-oriented and having a spiral axis inclined with respect to a direction normal to a surface of the substrate.

The invention also relates to a method for producing a twist-obliquely oriented film, which further comprises: sticking the twist-obliquely oriented liquid crystal layer of the twist-obliquely oriented film to an optical film through at least one adhesive layer; and removing the alignment layer and the substrate.

The invention relates to a twist-obliquely oriented film obtained by the aforementioned production method and it is preferable that an angle of orientation is not smaller than 1° but smaller than 180°; and a degree of obliquity is 30 or more, provided that the degree of obliquity is calculated as $$(|\Delta nd(-30) - \Delta nd(+30)|/\Delta nd(0)) \times 100$$

wherein $\Delta nd(0)$ is a retardation in a frontal direction, $\Delta nd(+30)$ and $\Delta nd(-30)$ are a retardation in a direction inclined at ±30° toward a slow axis and a retardation in a direction inclined at −30° toward the slow axis, respectively.

The invention may be configured so that the twist-obliquely oriented liquid crystal layer obtained by removing the alignment layer and the substrate from the twist-obliquely oriented film is used, and it relates to an optical film obtained by laminating at least one optical layer on the twist-obliquely oriented liquid crystal layer or the twist-obliquely oriented film. The invention further relates to an image display device to which the twist-obliquely oriented film, the twist-obliquely oriented liquid crystal layer and the optical film are applied. The invention further relates to an image display device produced by a step including an in-house production method.

As described above, in accordance with the invention, after the predetermined alignment layer is formed on a substrate and rubbed, a liquid crystal coating solution containing a chiral agent and a photopolymerizable liquid crystal composition is applied on the rubbed alignment layer to thereby stably obtain a twist-obliquely oriented film having a twist-obliquely oriented liquid crystal layer higher in the degree of obliquity than the conventional one. The twist-obliquely oriented film having the twist-obliquely oriented liquid crystal layer containing the chiral agent and the photopolymerizable liquid crystal composition can be likewise obtained as a film higher in the degree of obliquity than the conventional one. For example, the twist-obliquely oriented film can widen the viewing angle and can compensate for the visibility difference in image display caused by whether the optical axis is present or not when obliquely viewed from upper, lower, left and right sides in the direction of a line normal to the display surface. For this reason, the twist-obliquely oriented film according to the invention can be used particularly preferably for the purpose of compensating the viewing angle of the image display device.

BEST MODE FOR CARRYING OUT THE INVENTION

The present invention has found that a twist-obliquely oriented liquid crystal layer having a high degree of obliquity of 30 or more and having an angle of orientation not smaller than 10 but smaller than 180° can be obtained when a twist-obliquely oriented liquid crystal layer is formed by forming an alignment layer on a substrate, performing a rubbing treatment on the alignment layer and then applying a liquid crystal coating solution containing a chiral agent and a photopolymerizable liquid crystal composition.

Figure 1:
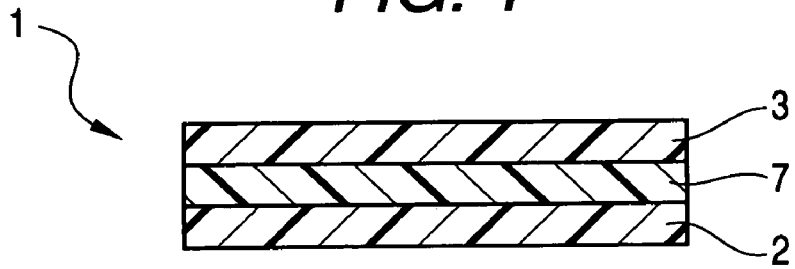
FIG. 1 is a sectional view of an embodiment of an obliquely oriented film according to the invention.

The twist-obliquely oriented film having the twist-obliquely oriented liquid crystal layer according to the invention is configured in such a manner that a twist-obliquely oriented liquid crystal layer is formed on a substrate having a predetermined alignment layer. To utilize the optical characteristic of the twist-obliquely oriented liquid crystal layer effectively, the twist-obliquely oriented film may be used directly or the twist-obliquely oriented liquid crystal layer may be used singly after removal of the substrate and the alignment layer from the twist-obliquely oriented film. Or the twist-obliquely oriented liquid crystal layer may be used after laminated on another optical film by use of an adhesive layer or the like. Especially, it is preferable from the point of view of durability and handling property that the twist-obliquely oriented film is used directly or transferred to another optical film. The twist-obliquely orientation of the twist-obliquely oriented liquid crystal layer according to the invention means that the oblique angle of nematic liquid crystal molecules needs to be not smaller than 1° to 85° with respect to the direction of a line normal to a surface of the substrate, and that the degree of obliquity is not lower than 30. FIG. 1 shows an embodiment of the twist-obliquely oriented film according to the invention. In the twist-obliquely oriented film 1, an alignment layer 7 and a twist-obliquely oriented liquid crystal layer 3 are laminated on a substrate 2.

A substrate made of any kind of material such as polymer, glass, metal, etc. can be used as the substrate for forming the twist-obliquely oriented liquid crystal layer. A polymer film is preferred from the point of view of handling property. A polymer film on which an alignment layer containing a glassy macromolecule or a silane coupling agent is provided is used. The thickness of the substrate inclusive of the alignment layer is generally from about 10 to about 1000 μm.

The polymer film is not particularly limited if the surface state or durability of the film is not worsened by the heating temperature for drying and orienting the photopolymerizable liquid crystal composition while there is no influence on the alignment layer. For example, a film made of a transparent polymer can be used as the polymer film. Examples of the transparent polymer include: polyester polymer such as polyethylene terephthalate, polyethylene naphthalate, etc.; cellulose polymer such as diacetyl cellulose, triacetyl cellulose, etc.; polycarbonate polymer; and acrylic polymer such as polymethyl methacrylate, etc. Examples of the transparent polymer further include: styrene polymer such as polystyrene, acrylonitrile-styrene copolymer, etc.; olefin polymer such as polyethylene, polypropylene, polyolefin having a cyclic or norbornene structure, ethylene-propylene copolymer, etc.; vinyl chloride polymer; and amide polymer such as aromatic polyamide, etc. Examples of the transparent polymer further include: imide polymer; sulfone polymer; polyether-sulfone polymer; polyether-ether-ketone polymer; polyphenylene sulfide polymer; vinyl alcohol polymer; vinylidene chloride polymer; vinyl butyral polymer; allylate polymer; polyoxymethylene polymer; epoxy polymer; and blends of these polymers. Especially, a polymer film of triacetyl cellulose, polyethylene terephthalate, polycarbonate, norbornene polyolefin or the like, which is high in hydrogen bonding characteristic and which can be used as a light-transmissive film, is preferably used. Especially, a triacetyl cellulose film is particularly preferred because the triacetyl cellulose film is low in optical anisotropy and can be used as a twist-obliquely oriented film in a state in which the alignment layer is formed on the film without necessity of transfer to another optical film.

Particularly when a polymer film having a norbornene structure is used as the substrate, the substrate has optically excellent characteristic because it is unnecessary to form any alignment layer on the substrate so that optical anisotropy becomes very low. When such a substrate is used for producing the twist-obliquely oriented film, the twist-obliquely oriented film can be used without transfer of the twist-obliquely oriented liquid crystal layer to another optical layer. Examples of such a polymer film include ZEONOR (trade name, produced by Zeon Corporation), ZEONEX (trade name, produced by Zeon Corporation), and ARTON (trade name, produced by JSR Corporation).

A thin film layer of a substance containing a glassy macromolecule or a silane coupling agent needs to be provided as the alignment layer provided on the substrate. The alignment layer need not be provided as a thin film layer if it substantially has the same effect. A substance containing a glassy macromolecule or a silane coupling agent may be contained in a surface or inside of the substrate or in the photopolymerizable liquid crystal composition. As a method for forming the alignment layer on the substrate, a solution for forming the alignment layer is applied, for example, by a roll coating method, a gravure coating method, a spin coating method, a bar coating method or the like. The solution is dried at room temperature or in a drying furnace or heated on a hot plate to thereby remove a solvent and accelerate the reaction. Because the alignment layer needs to be homogeneous and flexible, the thickness of the alignment layer is preferably in a range of from about 0.04 to 2 µm, more preferably in a range of from about 0.05 to 0.2 µm.

Metal alkoxide, especially metal silicon alkoxide is preferably used as the glassy macromolecule. Metal alkoxide is generally used as an alcoholic solution. After the solution is applied on the substrate, the solvent is removed and the solution is heated to accelerate a sol-gel reaction to thereby form a transparent glassy macromolecular film on the substrate. A metal silicon alkoxide gel layer is formed from metal silicon alkoxide sol. Specifically, a glassy macromolecular alignment layer formed from an isopropyl alcohol—2% butanol solution of ethyl silicate (COLCOAT P: produced by Colcoat Co., Ltd.) can be used.

As the silane coupling agent, a suitable agent constituted by an organic substance having silicon, straight-chain alkyl group, etc. and available on the market can be used without any limitation. In this invention, an organic substance having an acryloxy group or a methacryloxy group can be used preferably. For example, a silane coupling agent constituted by acryloxypropyltrimethoxy silane can be used especially preferably.

As the rubbing treatment, a method of unidirectionally rubbing a surface with a rubbing roll wound with cloth or leather made of fine fiber such as rayon or cotton can be used.

A liquid crystal compound which has at least one unsaturated double bond such as an acryloyl group or a methacryloyl group as a photopolymerizable functional group and which is nematic liquid crystalline is used as the photopolymerizable liquid crystal composition. An example of the photopolymerizable liquid crystal composition is acrylate or methacrylate formed from a monomer unit represented by the following formula 1:

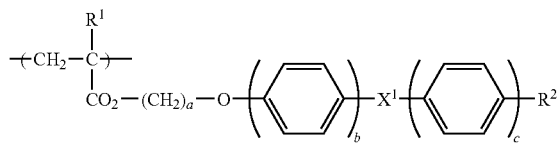

(Formula 1)

(wherein $R^1$ represents a hydrogen atom or a methyl group, a represents a positive integer of from 1 to 6, $X^1$ represents —$CO_2$— group or —OCO— group, $R^2$ represents a cyano group, an alkoxy group having 1-6 carbon atoms, a fluoro group or an alkyl group having 1-6 carbon atoms, and each of b and c represents an integer of 1 or 2).

A composition having two or more photopolymerizable functional groups is especially preferred as the photopolymerizable liquid crystal composition improved in durability. An example of the photopolymerizable liquid crystal composition can be a crosslinkable nematic liquid crystal monomer represented by the following formula 2:

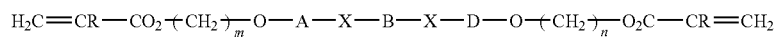

(Formula 2)

(wherein R represents a hydrogen atom or a methyl group, each of A and D represents a 1,4-phenylene group or a 1,4-cyclohexylene group independently, X represents —COO— group, —OCO group or —O— group independently, B represents a 1,4-phenylene group, a 1,4-cyclohexylene group, a 4,4'-biphenylene group or a 4,4'-bicyclohexylene group, and each of m and n represents an integer of from 2 to 6 independently). Examples of the photopolymerizable liquid crystal composition may include: a compound prepared by replacing the terminal "$H_2C$=CR—$CO_2$—" of the formula 5 with a vinyl ether group or an epoxy group; and a compound prepared by replacing "—$(CH_2)_m$—" and/or "—$(CH_2)_n$—" with "—$(CH_2)_3$—$C^*H(CH_3)$—$(CH_2)_2$—" or "—$(CH_2)_2$—$C^*H(CH_3)$—$(CH_2)_3$—".

For example, after the photopolymerizable liquid crystal composition is made liquid crystalline by heat treatment so as to exhibit a nematic liquid crystal phase, the photopolymerizable liquid crystal composition can be polymerized or crosslinked to thereby improve durability.

A photopolymerization initiator is preferably added into the liquid crystal coating solution containing the photopolymerizable liquid crystal composition. Any kind of photopolymerization initiator can be used without any particular limitation. Examples of the photopolymerization initiator include IRGACURE 907, IRGACURE 184, IRGACURE 651 and IRGACURE 369 produced by Ciba Specialty Chemicals. The amount of the photopolymerization initiator added can be decided in consideration of the kind, amount, etc. of the photopolymerizable liquid crystal composition so that orientation is not disturbed. Generally, about 0.5 to 30 parts by weight thereof is preferable, more preferably 3 to 15 parts by weight thereof, with respect to 100 parts by weight of the photopolymerizable liquid crystal composition.

The chiral agent added to a perpendicular alignment liquid crystal composition can be used without any particular limitation if the chiral agent has at least one polymerizable functional group and an optical active group and does not disturb the orientation of the liquid crystal composition. An acryloyl group or a methacryloyl group is preferred as the polymerizable functional group. Although the chiral agent is not limited by whether it has liquid crystal characteristic or not, a chiral agent particularly exhibiting cholesteric liquid crystal characteristic can be used preferably as the chiral agent so that twisted nematic alignment can be formed spirally.

The pitch for deciding a selective reflection wavelength varies according to the amount of the chiral agent added. The amount of the chiral agent added with respect to 100 parts by weight of the perpendicular orientation liquid crystal composition is in a range of from about 0.01 to 50 parts by weight, preferably in a range of from about 0.05 to 15 parts by weight. The twisting force of the chiral agent is preferably in a range from $1 \times 10^{-6}$ to $1 \times 10^{-2}$, more preferably in a range of from $5 \times 10^{-6}$ to $1 \times 10^{-3}$.

To control the angle of orientation of the nematic liquid crystal, the thickness of the liquid crystal layer, the amount of the chiral agent added and the twisting force of the chiral agent can be adjusted suitably in the aforementioned ranges to thereby control the angle of twist. According to this invention, the angle of orientation is preferably in a range of from not smaller than 1° and smaller than 180°, more preferably in a range of from 20° to 90°. It is practically most preferable that the angle of orientation is in a range of from 35° to 75°. If the angle of orientation is smaller than 1° (i.e. the alignment of the nematic liquid crystal is not twisted), the effect of compensating the optical axis cannot be expected. If the angle of orientation is larger than 180°, it is difficult to control the optical axis in a plane.

A solution coating method using a solution containing the liquid crystal composition dissolved in a solvent or a fusion coating method using the fused liquid crystal composition may be used for applying the liquid crystal coating solution on the substrate. Especially, the solution coating method for applying the solution on the substrate is preferred.

The solvent used for preparing the solution cannot be limited unconditionally because it varies according to the kind of the photopolymerizable liquid crystal composition, the kind of the substrate and the kind of the oriented film. Examples of the solvent which can be generally used include: halogenated hydrocarbons such as chloroform, dichloromethane, dichloroethane, tetrachloroethane, trichloroethylene, tetrachloroethylene, chlorobenzene, etc.; phenols such as phenol, parachlorophenol, etc.; aromatic hydrocarbons such as benzene, toluene, xylene, methoxybenzene, 1,2-dimethoxybenzene, etc.; and acetone, ethyl acetate, tert-butyl alcohol, glycerin, ethylene glycol, triethylene glycol, ethylene glycol monomethyl ether, diethylene glycol dimethyl ether, ethyl cellosolve, butyl cellosolve, 2-pyrolidone, N-methyl-2-pyrolidone, pyridine, triethylamine, tetrahydrofuran, dimethyl formamide, dimethyl acetamide, dimethyl sulfoxide, acetonitrile, butyronitrile, and carbon disulfide. The concentration of the solution cannot be said unconditionally because it depends on the solubility of the photopolymerizable liquid crystal composition used and the thickness of the twist-obliquely oriented liquid crystal layer as a last target. Generally, the concentration of the solution is in a range of from 3 to 50% by weight, preferably in a range of from 7 to 30% by weight.

The thickness of the twist-obliquely oriented liquid crystal layer after drying and orientation of the applied liquid crystal coating solution is preferably selected to be in a range of from about 1 to 10 μm. If the twist-obliquely oriented liquid crystal layer is too thick, irregularity occurs at the time of orientation and drying. If the twist-obliquely oriented liquid crystal layer is too thin, sufficient optical compensating characteristic cannot be obtained. As the thickness of the twist-obliquely oriented liquid crystal layer according to the invention increases, the degree of obliquity and the angle of twist increase so that the degree of freedom for optical design increases. Because a drawback however occurs easily as described above if the twist-obliquely oriented liquid crystal layer is too thick, it is preferable that two or more layers each having a suitable thickness are laminated. As the method, a method of applying a liquid crystal coating solution on a fixed twist-obliquely oriented liquid crystal layer and drying and fixing the liquid crystal coating solution can be preferably used. When three or more layers need to be laminated, this process is repeated. Although the number of layers to be laminated is not particularly limited, it is preferable that the number of layers is selected to be not larger than four when the orientation control force of the fixed twist-obliquely oriented liquid crystal layer is utilized as described above. Incidentally, when the thickness of the twist-obliquely oriented liquid crystal layer needs to be controlled particularly accurately, it is necessary to pay special attention to control of the concentration of the solution, the thickness just after coating (before drying), etc. because the thickness of the twist-obliquely oriented liquid crystal layer is almost decided at the stage in which it is applied on the substrate.

For example, a roll coating method, a gravure coating method, a spin coating method, a bar coating method or the like can be used as the method in which the liquid crystal coating solution having a desired concentration adjusted by use of the solvent is applied on the rubbed substrate. After coating, the solvent is removed so that the liquid crystal layer is formed on the substrate. The condition for removing the solvent is not particularly limited if the solvent can be substantially removed while the liquid crystal layer can be prevented from flowing or dropping out. Generally, the solvent is removed by means of drying at room temperature, drying in a drying furnace, heating on a hot plate, and so on.

Then, the liquid crystal layer formed on the substrate is oriented in a liquid crystal state. For example, a method of performing a heating treatment to obtain a liquid crystal temperature range to orient the liquid crystal layer in a liquid crystal state can be used. As the heat treatment method, the same method as the aforementioned drying method can be carried out. The temperature for the heating treatment cannot be said unconditionally because it varies according to the respective kinds of the liquid crystal coating solution, oriented film and substrate used. Generally, the temperature is selected to be in a range of from 60 to 300° C., preferably in a range of from 70 to 200° C. Likewise, the time for the heating treatment cannot be said unconditionally. Generally, the time is selected to be in a range of from 10 seconds to 2 hours, preferably in a range of from 20 seconds to 30 minutes. If the time is shorter than 10 seconds, there is a possibility that the formation of alignment cannot progress sufficiently. If the time is longer than 2 hours, there is a possibility that the state of alignment cannot be retained.

After the heating treatment is completed, it is necessary to fix the state of orientation. Examples of the fixing method include curing due to cooling to a temperature not higher than the glass transition temperature, and polymerization curing due to light irradiation. One or both of these techniques can be used suitably according to the characteristic of the perpendicular alignment liquid crystal composition. Generally, curing due to cooling is effective for a polymer whereas polymerization curing due to light irradiation is effective for a polymerizable monomer.

Cool curing for fixation can be performed in such a manner that the twist-obliquely oriented film after the heating treatment is taken out of the heating atmosphere of the heating operation into room temperature. Forced cooling such as air cooling or water cooling may be performed. When the twist-obliquely oriented liquid crystal layer is cooled to a temperature not higher than the glass transition temperature, the orientation of the twist-obliquely oriented liquid crystal layer is fixed.

For light irradiation for fixation, polymerizing or crosslinking light can be used in accordance with the property of the photopolymerizable liquid crystal composition. Generally, ultraviolet irradiation is used. Although it is preferable that ultraviolet irradiation is performed in an atmosphere of inert gas to accelerate the reaction sufficiently, the condition for ultraviolet irradiation is not limited thereto. Generally, a high-pressure mercury ultraviolet lamp having an illuminance of from about 80 to 160 mW/cm$^2$ can be used representatively. Or another type lamp such as a metahalide UV lamp or an incandescent lamp may be used. Incidentally, a cooling treatment such as cold mirroring or water cooling or a treatment of increasing the line speed needs to be performed so that the surface temperature of the liquid crystal layer at the time of ultraviolet irradiation can be adjusted suitably in the liquid crystal temperature range.

The twist-obliquely oriented film having the twist-obliquely oriented layer obtained thus may be used directly. Alternatively, after substrate having the alignment layer is separated from the twist-obliquely oriented film, the twist-obliquely oriented liquid crystal layer may be used singly or transferred to another optical layer.

Figure 2:
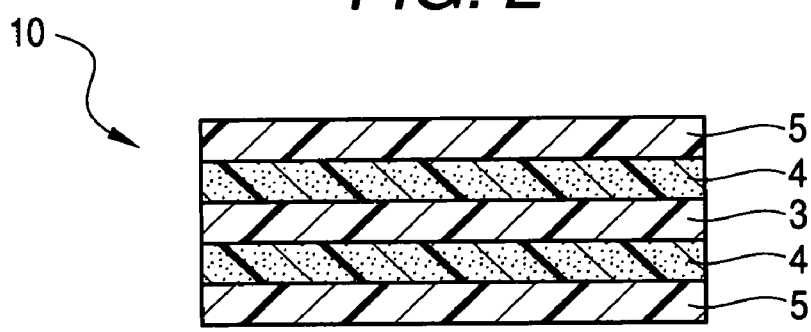
FIG. 2 is a sectional view of an embodiment of an optical film according to the invention.

A method of transferring the twist-obliquely oriented liquid crystal layer is carried out as follows. For example, an adhesive or a pressure-sensitive adhesive is used for forming an adhesive layer on a single surface of the optical layer or on one or each of surfaces of the twist-obliquely oriented liquid crystal layer of the twist-obliquely oriented film. Thus, the twist-obliquely oriented liquid crystal layer and the optical layer are bonded to each other by the adhesive layer. Then, the twist-obliquely oriented film is separated into two at the interface between the alignment layer and the twist-obliquely oriented liquid crystal layer, so that the resulting film is used as a twist-obliquely oriented film in which the optical layer, the adhesive layer and the twist-obliquely oriented liquid crystal layer are laminated. On this occasion, each of the optical layer, the adhesive layer and the twist-obliquely oriented liquid crystal layer may have a single layer structure or a multi-layer structure. Respective layers can be laminated suitably. FIG. 2 shows an embodiment of the optical film using the twist-obliquely oriented film according to the invention. The optical film 10 according to this embodiment is produced in such a manner that optical layers 5 are laminated on opposite surfaces through adhesive layers 4 respectively after the substrate 2 and the alignment layer 7 are separated from the twist-obliquely oriented film 1 in FIG. 1.

Each adhesive layer can be used without any limitation if it has no influence on required optical characteristic. For example, an adhesive agent or a pressure-sensitive adhesive agent containing a polymer as its base polymer can be selected suitably. Examples of the polymer include an acrylic polymer, a silicone polymer, polyester, polyurethane, polyamide, polyether, a fluorine polymer, and a rubber polymer. The form of these polymers is not particularly limited. Any kind of adhesive agent or pressure-sensitive adhesive agent such as a solvent type adhesive agent, a dispersion type adhesive agent or an emulsion type adhesive agent can be used. Particularly in the twist-obliquely oriented film according to the invention, an acrylic solvent type pressure-sensitive adhesive agent excellent in transparency, weather resistance, etc. may be used preferably.

The formation of the adhesive layer can be performed by a suitable method. Examples of the method include: a method in which a base polymer or a composition thereof is dissolved or dispersed into a solvent provided as a single suitable solvent such as toluene or ethyl acetate or provided as a mixture of these suitable solvents to thereby prepare a solution containing about 10 to 40% by weight of the pressure-sensitive adhesive agent and in which the solution is directly applied on the liquid crystal layer by a suitable spreading method such as a flow casting method or a coating method; and a method in which an adhesive layer made of a pressure-sensitive adhesive agent is formed on a separator subjected to a releasing treatment and in which the adhesive layer is transferred onto the liquid crystal layer. Additives which can be added to a pressure-sensitive adhesive layer may be contained in the adhesive layer. Examples of the additives include: resins such as a natural resin and a synthetic resin, especially a pressure-sensitive adhesiveness donating resin; and fillers constituted by glass fiber, glass beads, metal powder, another inorganic powder, etc.; pigments, a colorant, anti-oxidants, etc. Fine particles may be contained in the adhesive layer to prepare the adhesive layer as an adhesive layer exhibiting light-diffusing characteristic.

The optical layer onto which the twist-obliquely oriented liquid crystal layer according to the invention is transferred is not particularly limited if the optical layer can satisfy the required optical characteristic and can support the twist-obliquely oriented liquid crystal layer. For example, one layer or a laminate of two or more layers used for forming an image display device can be used as the optical layer. Examples of the layer include a polarizing plate, a reflection plate, a semi-transmissive plate, a diffusing plate, a retardation film (including a wavelength plate (λ plate) such as a half-wave plate or a quarter-wave plate), a viewing angle compensating film, a luminance-enhancement film, and a cholesteric liquid crystal film. Especially, when a cholesteric liquid crystal layer (cholesteric liquid crystal film) having a function of separating circularly polarized light having a selective reflection wavelength in a visual light region is laminated on the twist-obliquely oriented liquid crystal layer according to the invention while a function of a quarter-wave plate is given to the twist-obliquely oriented liquid crystal layer, a luminance-enhancement film can be prepared. When a polarizing plate is laminated on the luminance-enhancement film, it can be preferably used in an image display device. A polarizing plate, or a film subjected to a surface treatment for applying hard coating, anti-reflection, anti-sticking, diffusion or anti-glare on other optical layers or the retardation layer according to the invention, or a film having an oriented liquid crystal layer for compensating the viewing angle can be also used as the optical layer.

In the twist-obliquely oriented film having the twist-obliquely oriented liquid crystal layer produced as described above, the values of retardation are measured when the twist-obliquely oriented film is in a frontal direction and inclined at ±300 in a direction of the slow axis. Thus, the degree of obliquity is calculated by the following equation:

$$\text{Degree of obliquity} = (|\Delta nd(-30) - \Delta nd(+30)|/\Delta nd(0)) \times 100$$

(wherein $\Delta nd(0)$ is the value of retardation in the frontal direction, $\Delta nd(+30)$ and $\Delta nd(-30)$ are the value of retardation when the twist-obliquely oriented film is inclined at ±30° in the direction of the slow axis, respectively).

The degree of obliquity of the twist-obliquely oriented film according to the invention can be selected to be 30 or more, preferably 50 or more, especially preferably 70 or more. The upper limit is not particularly limited but is selected to be preferably not higher than 500, practically preferably not higher than 300. If the degree of obliquity is lower than 30, the range allowing optical compensation in the obliquely viewing direction is too narrow to satisfy practical use. If the degree of obliquity is higher than 500, uniformity of quality cannot be obtained by the method according to the invention.

The values of retardation ($\Delta nd(-30)$, $\Delta nd(+30)$, $\Delta nd(0)$) can be measured by use of various kinds of measuring devices. For example, when an automatic birefringence meter (e.g. KOBRA21ADH manufactured by Oji Scientific Instruments) is used, the respective values can be measured.

An example of the polarizing plate which can be used as the optical layer is prepared in such a manner that a protective sheet is bonded to one or each of opposite surfaces of a polarizer made of a dichromatic substance-containing polyvinyl alcohol film or the like through a suitable adhesive layer made of a polyvinyl alcohol polymer or the like.

For example, as a method for producing the polarizer, a method of dyeing a polyvinyl alcohol film with iodine and then stretching the film to orient the iodine can be used.

The polarizer is not particularly limited. Any kind of polarizer can be used. Examples of the polarizer include: a sheet prepared by adsorbing iodine and/or dichromatic dye onto a hydrophilic macromolecular film such as a polyvinyl alcohol film, a partially formalized polyvinyl alcohol film or an ethylene-vinyl acetate copolymer partially saponified film and uniaxially stretching the hydrophilic macromolecular film; and a polyene oriented film such as dehydrated polyvinyl alcohol or dehydrochlorinated polyvinyl chloride. Especially, a polarizer constituted by a polyvinyl alcohol film and a dichromatic substance such as iodine is preferred. The thickness of the polarizer is not particularly limited but is generally in a range of from about 5 to 80 μm.

The polarizer may contain boric acid, zinc sulfate, zinc chloride, etc. if necessary. The polarizer may be immersed in an aqueous solution of potassium iodide or the like.

A material excellent in transparency, mechanical strength, heat stability, moisture sealability, isotropy, etc. is preferably used as a material for forming the protective sheet provided on one or each of opposite surfaces of the polarizer. Examples of the material include: polyester polymers such as polyethylene terephthalate, polyethylene naphthalate, etc.; cellulose polymers such as diacetyl cellulose, triacetyl cellulose, etc.; acrylic polymers such as polymethyl methacrylate, etc.; styrene polymers such as polystyrene, acrylonitrile-styrene copolymer (AS resin), etc.; and polycarbonate polymers. Examples of the polymer for forming the protective sheet further include: polyolefin polymers such as polyethylene, polypropylene, polyolefin having a cyclic or norbornene structure, ethylene-propylene copolymer, etc.; vinyl chloride polymers; amide polymers such as Nylon, aromatic polyamide, etc.; imide polymers; sulfone polymers; polyether-sulfone polymers; polyether-ether-ketone polymers; polyphenylene sulfide polymers; vinyl alcohol polymers; vinylidene chloride polymers; vinyl butyral polymers; allylate polymers; polyoxymethylene polymers; epoxy polymers; and blends of these polymers. The protective sheet can be also formed as a cured layer of a heat-curable or ultraviolet-curable resin such as an acrylic resin, an urethane resin, an acrylic urethane resin, an epoxy resin, a silicone resin, etc. Especially, cellulose polymers are preferred.

A polymer film described in JP 2001-343529 A (WO 01/37007) can be used as the protective sheet. An example of the polymer film is a resin composition containing (A) a thermoplastic resin having a substitutional and/or non-substitutional imide group in a side chain, and (B) a thermoplastic resin having a substitutional and/or non-substitutional phenyl group and a nitrile group in a side chain. A specific example is a film of a resin composition containing an isobutene-N-methyl maleimide alternating copolymer and an acrylonitrile-styrene copolymer. A film made of a mixture extrudate of resin compositions etc. can be used as the film.

The thickness of the protective sheet is not particularly limited but is generally not larger than 500 μm, preferably in a range of from 1 to 300 μm, more preferably in a range of from 5 to 200 μm. It is preferable from the point of view of polarizing characteristic, durability, etc. that a surface of the protective film is saponified with alkali or the like.

It is preferable that the protective sheet is as colorless as possible. Accordingly, a transparent protective film in which the value of retardation in the direction of the thickness of the film as represented by $Rth = [(nx+ny)/2 - nz] \cdot \underline{d}$ (in which nx and ny are main refractive indices in a plane of the film, nz is a refractive index in the direction of the thickness of the film, and $\underline{d}$ is the thickness of the film) is in a range of from −90 nm to +75 nm is used preferably. When the transparent protective film exhibiting the value of retardation (Rth) of from −90 to +75 nm in the direction of the thickness is used, coloring (optical coloring) of the polarizing plate caused by the transparent protective film can be almost eliminated. The value of retardation (Rth) in the direction of the thickness is further preferably in a range of from −80 to +60 nm, more preferably in a range of from −70 to +45 nm.

As for the protective sheet, two protective sheets bonded to opposite surfaces of the polarizer may have different characteristics respectively. Examples of the characteristics include thickness, material, light transmittance, tensile elastic modulus, presence/absence of an optical layer, and so on, though the characteristics are not limited thereto.

In practical use, various kinds of processing may be applied to the polarizing plate. The processing method is not particularly limited. For example, a method of applying a surface treatment to a surface (on which the adhesive coating layer is not provided) of the transparent protective film opposite to the polarizer side for hard coating, anti-reflection, anti-sticking, diffusing or anti-glare or laminating a liquid crystal layer on the surface of the transparent protective film for viewing angle compensation or the like can be used. One layer of the twist-obliquely oriented film used for forming a liquid crystal display device, such as an anti-reflection plate, a semi-transmissive plate, a retardation plate (including a wavelength plate (λ plate) such as a half-wave plate or a quarter-wave plate), a viewing angle compensating film, etc. may be used or two or more layers of the twist-obliquely oriented films may be bonded to each other.

The hard coating treatment is provided for preventing a surface of a film such as a polarizing plate from being injured. For example, the hard coating treatment can be made by a method in which a cured film made from a suitable ultraviolet-curable resin such as an acrylic resin or a silicone resin and excellent in hardness, slip characteristic, etc. is applied on a surface of the transparent protective film. The anti-reflection treatment is provided for preventing external light from being reflected on a surface of the polarizing plate. For example, the anti-reflection treatment can be achieved in such a manner that an anti-reflection film according to the background art is formed. The anti-sticking treatment is provided for preventing a layer from being stuck closely to an adjacent layer.

The anti-glare treatment is provided for preventing visual recognition of light transmitted through the polarizing plate from being disturbed by external light reflected on a surface of the polarizing plate. For example, the anti-glare treatment can be made in such a manner that a fine roughness structure is given to a surface of the transparent protective film by a suitable method such as a surface roughening method using sandblasting or embossing or a method of mixing transparent fine particles. For example, transparent fine particles having a mean particle size of from 0.5 to 50 μm can be used as the fine particles contained for forming the surface fine roughness structure. Examples of the transparent fine particles include: inorganic fine particles which are made of silica, alumina, titania, zirconia, tin oxide, indium oxide, cadmium oxide, antimony oxide, etc. and which may be electrically conductive; and organic fine particles made of a crosslinked or non-crosslinked polymer. The amount of the fine particles used for forming the surface fine roughness structure is selected to be generally in a range of from about 2 to 70 parts by weight, preferably in a range of from 5 to 50 parts by weight with respect to 100 parts by weight of the transparent resin used for forming the surface fine roughness structure. The anti-glare layer may serve as a diffusing layer (having a viewing angle widening function, etc.) for diffusing light transmitted through the polarizing plate to thereby widen the viewing angle.

Incidentally, the optical layers such as the anti-reflection layer, the anti-sticking layer, the diffusing layer and the anti-glare layer may be provided on the transparent protective film per se or may be provided separately from the transparent protective film.

The process of bonding the polarizer and the transparent protective film to each other is not particularly limited. For example, the bonding process can be made through an adhesive agent made of a vinyl polymer or through an adhesive agent at least containing boric acid or borax, glutaraldehyde or melamine, and a water soluble crosslinking agent of a vinyl alcohol polymer of oxalic acid or the like. The adhesive layer can be formed as a layer formed by application of an aqueous solution and dried. When the aqueous solution is prepared, other additives or a catalyst such as acid may be mixed with the aqueous solution if necessary.

The reflective polarizing plate is prepared by providing a reflection layer on a polarizing plate. The reflective polarizing plate is provided for forming a liquid crystal display device of the type of reflecting light given from the visual side (display side) and using the reflected light for display. The reflective polarizing plate has an advantage in that reduction in thickness and size of the liquid crystal display device can be attained easily because a built-in light source such as a backlight unit can be dispensed with. The reflective polarizing plate can be formed by a suitable method such as a method of applying a reflection layer made of a metal or the like on a single surface of a polarizing plate through a transparent protective layer if necessary.

A specific example of the reflective polarizing plate is a reflective polarizing plate having a reflection layer formed in such a manner that a sheet of foil or a deposit film made of a reflective metal such as aluminum is applied on a single surface of a transparent protective film matted if necessary. Another specific example is a reflective polarizing plate having a reflection layer of a roughness structure formed on a surface fine roughness structure formed in such a manner that the transparent protective film is made to contain fine particles. The reflection layer of the fine roughness structure has an advantage in that incident light is scattered by irregular reflection to prevent directivity and glaring looks and suppress irregularity in brightness and darkness. The transparent protective film containing fine particles has an advantage in that incident light and reflected light thereof are diffused when transmitted through the transparent protective film to thereby suppress irregularity in brightness and darkness more sufficiently. The reflection layer of the fine roughness structure formed by reflecting the surface fine roughness structure of the transparent protective film can be formed in such a manner that a metal is directly applied on a surface of the transparent protective film by a suitable method such as a vapor deposition method or a plating method. Specific examples of the suitable method include a vacuum vapor deposition method, an ion-plating method, and a sputtering method.

The reflection plate may be used as a reflection sheet having a suitable film according to the transparent film, and a reflection layer provided on the suitable film, in place of the method of directly applying the reflection plate on the transparent protective film of the polarizing plate. Incidentally, because the reflection layer is generally made of a metal, it is preferable that the reflection layer is used in the condition that the reflection surface of the reflection layer is coated with a transparent protective film, a polarizing plate, etc. in order to prevent reduction in reflectance caused by oxidation, keep initial reflectance for a long term and avoid provision of any special protective layer.

Incidentally, the semi-transmissive polarizing plate can be obtained in such a manner that the aforementioned reflection layer is provided as a semi-transmissive reflection layer such as a half mirror capable of reflecting part of light and transmitting the other part of light. The semi-transmissive polarizing plate is generally provided on the rear side of a liquid crystal cell to form a liquid crystal display device or the like of the type in which light given from the visual side (display side) is reflected to display an image when the liquid crystal display device or the like is used in a relatively bright condition and in which a built-in light source such as a backlight unit provided on the back side of the semi-transmissive polarizing plate is used to display an image when the liquid crystal display device or the like is used in a relatively dark condition. That is, the semi-transmissive polarizing plate is useful for forming a liquid crystal display device or the like of the type in which energy spent by a light source such as a backlight unit can be saved in a bright condition and in which the built-in light source can be used even in a relatively bright condition.

When a retardation plate is further laminated on the polarizing plate, an elliptically or circularly polarizing plate is formed. The retardation plate or the like is used for converting linearly polarized light into elliptically or circularly polarized light, converting elliptically or circularly polarized light into linearly polarized light or changing the direction of polarization of linearly polarized light. Particularly, a so-called quarter-wave plate (also called λ/4 plate) is used as a retardation plate for converting linearly polarized light into circularly polarized light or converting circularly polarized light into linearly polarized light. A half-wave plate (also called λ/2 plate) is generally used for changing the direction of polarization of linearly polarized light.

The elliptically polarizing plate is used effectively for compensating (preventing) coloring (blue or yellow) caused by the birefringence of a liquid crystal layer of a super-twisted nematic (STN) liquid crystal display device to achieve monochrome display free from the coloring. Moreover, when three-dimensional refractive indices are controlled, coloring generated in oblique view of the display screen of the liquid crystal display device can be compensated (prevented), preferably. For example, the circularly polarizing plate is used effectively for adjusting the color tone of an image on a reflective liquid crystal display device of a color image display type. The circularly polarizing plate also has an anti-reflection function.

Examples of the retardation plate include: a birefringence film formed by uniaxially or biaxially stretching a macromolecular material; and a liquid crystal oriented film. The retardation plate may have a suitable retardation in accordance with the purpose of use such as the purpose of compensating the coloring, the viewing angle, etc. caused by the birefringence of various kinds of wavelength plates and a liquid crystal layer. Two or more retardation plates may be laminated to control optical characteristic such as a retardation. For example, the stretching process can be made by a roll stretching method, a long-gap stretching method, a tenter stretching method, a tubular stretching method, etc. The stretching ratio is generally in a range of from about 1.1 to 3 times in the case of uniaxial stretching. The thickness of the retardation plate is not particularly limited but may be selected to be generally in a range of from 10 to 200 μm, preferably in a range of from 20 to 100 μm.

Examples of the macromolecular material include polyvinyl alcohol, polyvinyl butyral, polymethyl vinyl ether, polyhydroxyethyl acrylate, hydroxyethyl cellulose, hydroxypropyl cellulose, methyl cellulose, polycarbonate, polyallylate, polysulfone, polyethylene terephthalate, polyethylene naphthalate, polyether-sulfone, polyphenylene sulfide, polyphenylene oxide, polyaryl sulfone, polyvinyl alcohol, polyamide, polyimide, polyolefin, polyvinyl chloride, cellulose polymer, various binary or ternary copolymers of these, graft copolymer, and blends of these. These macromolecular materials are changed to oriented substances (stretched films) by stretching or the like.

Examples of the liquid crystal polymer include various kinds of main-chain or side-chain polymers having conjugate linear atom groups (mesogen groups) introduced into its main chain or side chain for donating liquid crystal orienting characteristic. Specific examples of the main-chain liquid crystal polymer include polymers each having such a structure that mesogen groups are connected by a spacer portion for donating flexing characteristic, that is, a nematic oriented polyester liquid crystal polyester, a discotic polymer, and a cholesteric polymer. Specific examples of the side-chain liquid crystal polymer include polymers each of which has polysiloxane, polyacrylate, polymethacrylate or polymalonate as a main chain skeleton, and a mesogen portion of a nematic orientation-donating para-substitutional cyclic compound unit through a spacer portion of conjugate atom groups as a side chain. Each of these liquid crystal polymers can be produced, for example, by a method in which a liquid crystal polymer solution is spread on a rubbed surface of a thin film of polyimide, polyvinyl alcohol or the like formed on a glass plate or on an oriented surface of obliquely deposited silicon oxide and then heated.

The elliptically polarizing plate or the reflective elliptically polarizing plate is provided as a laminate using a suitable combination of a polarizing plate or a reflective polarizing plate and a retardation plate. The elliptically polarizing plate etc. may be formed in such a manner that a (reflective) polarizing plate and a retardation plate are laminated successively and separately in the process of production of a liquid crystal display device so that the (reflective) polarizing plate and the retardation plate can be combined with each other. Or the elliptically polarizing plate etc. may be provided as an optical film in advance. The elliptically polarizing plate provided as an optical film is excellent in stability of quality and efficiency in laminating work, so that there is an advantage in that efficiency in production of a liquid crystal display or the like can be improved.

The viewing angle compensating film is a film for widening the viewing angle so that an image can be seen relatively sharply even in the case where a display surface of a liquid crystal display device is viewed not perpendicularly but slightly obliquely. Examples of the viewing angle compensating retardation plate include: a retardation plate; an oriented film of a liquid crystal polymer; and a transparent substrate having an alignment layer of a liquid crystal polymer supported thereon. The general retardation plate is made of a polymer film uniaxially stretched in an in-plane direction so as to have birefringence, whereas the retardation plate used as the viewing angle compensating film is made of a polymer film biaxially stretched in an in-plane direction so as to have birefringence or a bidirectionally stretched film such as a polymer film or a gradient oriented film uniaxially stretched in an in-plane direction and further stretched in a direction of thickness so as to have birefringence with the refractive index controlled in the direction of thickness. Examples of the gradient oriented film include: a polymer film stretched and/or shrunk under action of shrinking force of a heat-shrinkable film due to heating after the heat-shrinkable film is bonded to the polymer film; and a film of a liquid crystal polymer oriented obliquely. Polymers listed above in the description of the retardation plate can be used as materials for forming the retardation plate. A suitable polymer to be used can be selected from the point of view of prevention of coloring caused by change in viewing angle based on the retardation in a liquid crystal cell and enlargement of the viewing angle with good visibility.

To achieve a wide viewing angle with good visibility, there can be preferably used an optically compensating retardation plate which is formed in such a manner that an optically anisotropic layer made of an oriented layer of a liquid crystal polymer, especially made of an obliquely oriented liquid crystal layer of a discotic liquid crystal polymer, is supported by a triacetyl cellulose film.

The luminance-enhancement film exhibits characteristic of reflecting part of linearly polarized light with a predetermined axis of polarization or circularly polarized light with a predetermined direction but transmitting the other part of light when natural light is incident on the luminance enhancement film from a backlight unit of a liquid crystal display device or by reflection in the rear side. The polarizing plate provided as a laminate of a polarizing plate and a luminance-enhancement film is provided so that part of light having a predetermined polarized state is transmitted and the other part of light not having the predetermined polarized state is not transmitted but reflected when light emitted from a light source such as a backlight unit is incident on the polarizing plate. Light reflected by a surface of the luminance-enhancement film may be returned by a reflection layer etc. provided on the rear side of the luminance-enhancement film so that the light can be made incident on the luminance-enhancement film again. As a result, the light can be partially or wholly transmitted as light having the predetermined polarized state to attain increase in the amount of light transmitted through the luminance-enhancement film. Moreover, polarized light incapable of being absorbed to the polarizer can be supplied to attain increase in the amount of light allowed to be used for liquid crystal display etc. In this manner, luminance can be improved. That is, if light emitted from a backlight unit on the rear side of a liquid crystal cell is made incident on the polarizer without use of any luminance-enhancement film, the light can be little transmitted through the polarizer because a large part of light having a direction of polarization not coincident with the axis of polarization of the polarizer is absorbed to the polarizer. That is, though the amount of transmitted light varies according to the characteristic of the polarizer used, about 50% of light is generally absorbed to the polarizer to decrease the amount of light allowed to be used for liquid crystal display to thereby darken an image. The luminance-enhancement film does not transmit light having a direction of polarization which will be absorbed to the polarizer, that is, the luminance-enhancement film once reflects such light. The reflected light is returned by a reflection layer etc. provided on the rear side of the luminance-enhancement film so that the light can be made incident on the luminance-enhancement film again. While this operation is repeated, the direction of polarization of light reflected and returned between the luminance-enhancement film and the reflection layer can be changed to allow the light to be transmitted through the polarizer. Only polarized light having the direction of polarization changed in this manner is supplied to the polarizer. Accordingly, light emitted from a backlight unit or the like can be effectively used for image display on a liquid crystal display device, so that the screen of the liquid crystal display device can be made bright.

A diffusing plate may be provided between the luminance-enhancement film and the reflection layer or the like. Light of a polarized state reflected by the luminance-enhancement film advances toward the reflection layer or the like. The diffusing plate provided thus diffuses evenly light transmitted through the diffusing plate while eliminating the polarized state to a non-polarized state. That is, it is restored to a natural light state. The light of the non-polarized state, that is, the natural light state advances toward the reflection layer or the like and is reflected by the reflection layer or the like. The reflected light is transmitted through the diffusing plate again, so that the light is made incident on the luminance-enhancement film again. This operation is repeated. When the diffusing plate for restoring to its original natural light state is provided thus, a screen of uniform brightness can be provided so that irregularity of brightness of the display screen can be reduced while brightness of the display screen can be retained. It is conceived that a display screen of uniform brightness can be provided because of moderate increase in the number of repetitions in reflection of initial incident light in addition to the diffusing function of the diffusing plate when the diffusing plate for restoring to its original natural light state is provided.

Examples of the luminance-enhancement film that can be used suitably include: a film exhibiting characteristic of transmitting linearly polarized light having a predetermined axis of polarization but reflecting the other part of light, such as a multilayer dielectric thin film or a multilayer laminate of thin films different in refractive index anisotropy; and a film exhibiting characteristic of reflecting either left-handed circularly polarized light or right-handed circularly polarized light but transmitting the other part of light, such as an oriented film of a cholesteric liquid crystal polymer or a film substrate having an oriented liquid crystal layer of a cholesteric liquid crystal polymer supported thereon.

Accordingly, in a luminance-enhancement film of the type of transmitting linearly polarized light having a predetermined axis of polarization as described above, when light transmitted through the luminance-enhancement film is made incident on the polarizing plate with the axis of polarization kept constant as it is, the light can be efficiently transmitted through the polarizing plate while absorption loss due to the polarizing plate is suppressed. On the other hand, in a luminance-enhancement film of the type of transmitting circularly polarized light in the same manner as in a cholesteric liquid crystal layer, though the circularly polarized light can be made incident on the polarizer directly, it is preferable from the point of view of suppression of absorption loss that the circularly polarized light is converted into linearly polarized light by a retardation plate so that the linearly polarized light can be made incident on the polarizing plate. Incidentally, when a quarter-wave plate is used as the retardation plate, circularly polarized light can be converted into linearly polarized light.

When the twist-obliquely oriented liquid crystal layer or the twist-obliquely oriented film is applied to a luminance-enhancement film, it is preferable that the layer functioning as a quarter-wave plate in a wide wavelength range such as a visual light wavelength range is used. The quarter-wave plate can be produced in such a manner that the refractive indices are controlled so that the values of nx and ny as in-plane refractive indices satisfy $|nx|ny|=\lambda/4$ ($\lambda$: measurement wavelength [nm]). The quarter-wave plate can be obtained by a method in which a retardation layer functioning as a quarter-wave plate for monochromatic light, for example, with a wavelength of 550 nm and a retardation layer exhibiting another retardation characteristic, for example, a retardation layer functioning as a half-wave plate are superposed on each other. Accordingly, the retardation layer may be constituted by one layer or two or more layers.

Incidentally, when the cholesteric liquid crystal layer is formed as an arrangement structure in which two layers or three or more layers different in reflection wavelength are laminated in combination, the cholesteric liquid crystal layer can be obtained as a layer reflecting circularly polarized light in a wide wavelength range such as a visible light wavelength range. As a result, circularly polarized light transmitted through the cholesteric liquid crystal layer in a wide wavelength range can be obtained.

The polarizing plate used as an optical layer may be formed as a laminate of a polarizing plate and two or three or more optical layers in the same manner as in the polarized light separating type polarizing plate. Therefore, the polarizing plate may be a reflective elliptically polarizing plate or semi-transmissive elliptically polarizing plate formed by combination of the reflective polarizing plate or semi-transmissive polarizing plate and the retardation plate.

Although the twist-obliquely oriented film, which is a laminate of the polarizing plate and the optical layers, can be also formed by a method of laminating the optical layers successively and separately in the process of production of a liquid crystal display device or the like, the twist-obliquely oriented film formed by lamination in advance is excellent in stability of quality, efficiency in assembling work, and so on, and brings an advantage in that the process of production of a liquid crystal display device or the like can be improved. Suitable bonding means such as a pressure-sensitive adhesive layer can be used for lamination. When the polarizing plate and another optical layer are bonded to each other, the optical axes thereof can be disposed to form a suitable angle in accordance with the target retardation characteristic.

The twist-obliquely oriented film or the twist-obliquely oriented liquid crystal layer or the optical film using these is used on the front surface side of a surface light source having a reflection layer on the rear surface side in an illuminator used in an image display device or the like. It is preferable that the illuminator has at least one prism array layer. It is more preferable that the illuminator has two or more prism array layers in a state in which directions of arrangement of arrays cross each other in upper and lower layers.

Figure 3:
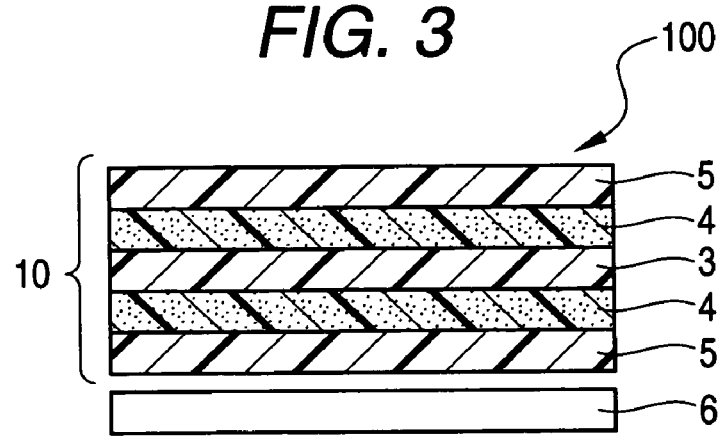
FIG. 3 is a sectional view of an embodiment of an image display device according to the invention.

The twist-obliquely oriented film or twist-obliquely oriented liquid crystal layer according to the invention or the optical film using these can be preferably used for forming an image display device such as a liquid crystal display device, an organic EL display device, a PDP, etc. FIG. 3 shows an embodiment of the image display device according to the invention. The image display device 100 includes a member 6 equivalent to a liquid crystal cell, an organic EL emitter or the like which will be described later, and an optical film 10 shown in FIG. 2 and disposed on the member 6. For example, the image display device 100 can be used in a reflective or semi-transmissive liquid crystal display device or a transmission-reflection double type liquid crystal display device in which a polarizing plate is disposed on one or each of opposite surfaces of a liquid crystal cell. The liquid crystal cell substrate may be a plastic substrate or a glass substrate. The liquid crystal cell used for forming the liquid crystal display device can be selected optionally. For example, there may be used any suitable type of liquid crystal cell such as an active matrix drive type liquid crystal cell represented by a thin-film transistor type liquid crystal cell or a passive matrix drive type liquid crystal cell represented by a twisted nematic liquid crystal cell or a super-twisted nematic liquid crystal cell.

Next, an organic electroluminescence device (organic EL display device) will be described. Generally, in the organic EL display device, a transparent electrode, an organic light-emitting layer and a metal electrode are laminated successively on a transparent substrate to thereby form an emitter (organic electroluminescence emitter). The organic light-emitting layer is provided as a laminate of various organic thin films. For example, there are known configurations of various combinations such as a laminate of a hole injection layer made of a triphynylamine derivative or the like and a luminous layer made of an organic fluorescent solid substance such as anthracene, a laminate of the light-emitting layer and an electron injection layer made of a perylene derivative or the like, and a laminate of the hole injection layer, the light-emitting layer and the electron injection layer.

The organic EL display device emits light on the basis of the following principle. When a voltage is applied between the transparent electrode and the metal electrode, holes and electrons are injected into the organic light-emitting layer. In the organic light-emitting layer, these holes and electrons are recombined to generate energy for exciting the fluorescent substance. When the excited fluorescent substance is restored to its normal state, light is radiated from the fluorescent substance. The mechanism of hole-electron recombination in the middle of the aforementioned principle is the same as that of a general diode. As expected from this fact, both electric current and intensity of emitted light exhibit strong nonlinearity resulting from rectifiability with respect to the applied voltage.

In the organic EL display device, at least one electrode must be transparent to take out light emitted from the organic light-emitting layer. Generally, a transparent electrode made of a transparent electrical conductor such as indium tin oxide (ITO) is used as an anode. On the other hard, it is important that a substance small in work function is used as a cathode to make electron injection easy to improve luminous efficiency. Generally, a metal electrode made of Mg—Ag, Al—Li or the like is used as the cathode.

In the organic EL display device configured as described above, the organic light-emitting layer is formed as a very thin film about 10 nm thick. Accordingly, like the transparent electrode, the organic light-emitting layer transmits light approximately perfectly. As a result, light incident on a surface of the transparent substrate, transmitted through both the transparent electrode and the organic light-emitting layer and reflected by the metal electrode at the time of non-emitting operation comes to the surface side of the transparent substrate again. Accordingly, when viewed from the outside, a display surface of the organic EL display device looks like a mirror surface.

In an organic EL display device including an organic electroluminescence emitter having an organic light-emitting layer for emitting light by application of a voltage, a transparent electrode provided on a front surface side of the organic light-emitting layer, and a metal electrode provided on a rear surface side of the organic light-emitting layer, a polarizing plate may be provided on the front surface side of the transparent electrode and a retardation film may be provided between the transparent electrode and the polarizing plate.

The retardation film such as the twist-obliquely oriented film according to the invention and the polarizing plate have a function of polarizing light which comes from the outside and which is reflected by the metal electrode. Accordingly, the polarizing function thereof is effective in preventing the mirror surface of the metal electrode from being visually recognized from the outside. Particularly when the retardation film is constituted by a quarter-wave plate while the angle between the polarizing plate and the retardation film is adjusted to $\pi/4$, the mirror surface of the metal electrode can be shaded perfectly.

That is, only a linearly polarized light component of external light incident on the organic EL display device is transmitted through the polarizing plate. Generally, the linearly polarized light is converted into elliptically polarized light by the retardation film. Particularly when the retardation film is constituted by a quarter-wave plate while the angle between the polarizing plate and the retardation film in terms of the direction of polarization is adjusted to $\pi/4$, the linearly polarized light is converted into circularly polarized light by the retardation film.

The circularly polarized light is transmitted through the transparent substrate, the transparent electrode and the organic thin film and then reflected by the metal electrode. The reflected light is transmitted through the organic thin film, the transparent electrode and the transparent substrate again and converted into linearly polarized light by the retardation film again. The linearly polarized light cannot be transmitted through the polarizing plate because it is perpendicular to the direction of polarization of the polarizing plate. As a result, the mirror surface of the metal electrode can be shaded perfectly.

In the PDP, electric discharge is generated in rare gas enclosed in a panel, especially gas mainly containing neon. Vacuum ultraviolet light caused by the electric discharge excites fluorescent substances of R, G and B applied on the cell of the panel.

In the field of the image display device, in-house production is required for consistently executing the steps of punching pieces from various optical films, screening the pieces and bonding the pieces for the sake of reduction in cost. In the in-house production method for performing integrated production in all the steps of from the step of after-treating (cutting) an optical film to the step of bonding the optical film to a cell, it is necessary to measure the failure area immediately. When the twist-obliquely oriented film according to the invention is used in image display devices, it is necessary to design optical axes in accordance with the respective display devices. However, in the twist-obliquely oriented film according to the invention, the optical axes can be adjusted on the basis of the thickness of the liquid crystal layer and the mixture ratio of the liquid crystal composition and the chiral agent. Accordingly, the twist-obliquely oriented film can be bonded continuously as it is in the condition that the twist-obliquely oriented film is a long-sheet film without necessity of punching a rectangular single plate from the film at an angle of a desired optical axis and bonding the rectangular single plate in the middle. Accordingly, the twist-obliquely oriented film according to the invention can be preferably used for in-line production in which the step of bonding the twist-obliquely oriented film to an image display device such as a liquid crystal display device or an EL display device is carried out by one line without passing through the steps of punching, bonding, carrying, packaging and unpacking in the middle.

EXAMPLES

The invention will be described below more specifically in connection with Examples but is not limited by the Examples.

Preparation of Liquid Crystal Coating Solution A

Into 40 g of cyclohexanone, 9.991 g of a nematic liquid crystal type photopolymerizable liquid crystal composition (PALIOCOLOR LC242, produced by BASF), 0.009 g of a chiral agent (PALIOCOLOR LC756, produced by BASF) and 3.0 g of a photopolymerization initiator (IRGACURE 907, produced by Ciba Specialty Chemicals) were dissolved.

Preparation of Liquid Crystal Coating Solution B

Into 40 g of toluene, 9.984 g of a nematic liquid crystal type photopolymerizable liquid crystal composition (PALIOCOLOR LC242, produced by BASF), 0.016 g of a chiral agent (PALIOCOLOR LC756, produced by BASF) and 3.0 g of a photopolymerization initiator (IRGACURE 907, produced by Ciba Specialty Chemicals) were dissolved.

Preparation of Liquid Crystal Coating Solution C

Into 40 g of toluene, 10.0 g of a nematic liquid crystal type photopolymerizable liquid crystal composition (PALIOCOLOR LC242, produced by BASF) and 3.0 g of a photopolymerization initiator (IRGACURE 907, produced by Ciba Specialty Chemicals) were dissolved.

Production of Oriented Substrate A

After 3-acryloxypropyltrimethoxy silane (KBM5103, produced by Shin-Etsu Chemical Co., Ltd.) was applied on a polyethylene terephthalate (PET) film substrate by a bar coater, the 3-acryloxypropyltrimethoxy silane was heated at 120° C. for 1 minute so as to be dried to form an alignment layer about 0.1 µm thick. Then, the alignment layer was rubbed with rayon cloth to perform a rubbing treatment.

Production of Oriented Substrate B

After 3-acryloxypropyltrimethoxy silane (KBM5103, produced by Shin-Etsu Chemical Co., Ltd.) was applied on a triacetyl cellulose (TAC) film substrate by a bar coater, the 3-acryloxypropyltrimethoxy silane was heated at 120° C. for 1 minute so as to be dried to form an alignment layer about 0.1 µm thick. Then, the alignment layer was rubbed with rayon cloth to perform a rubbing treatment.

Production of Oriented Substrate C

After an isopropyl alcohol-2% butanol solution of ethyl silicate (COLCOAT P, produced by Colcoat Co., Ltd.) was applied on a polyethylene terephthalate (PET) film substrate by a bar coater, the solution was heated at 120° C. for 1 minute so as to be dried to form an alignment layer about 0.1 µm thick. Then, the alignment layer was rubbed with rayon cloth to perform a rubbing treatment.

Production of Oriented Substrate D

After an isopropyl alcohol-2% butanol solution of ethyl silicate (COLCOAT P, produced by Colcoat Co., Ltd.) was applied on a triacetyl cellulose (TAC) film substrate by a bar coater, the solution was heated at 120° C. for 1 minute so as to be dried to form an alignment layer about 0.1 µm thick. Then, the alignment layer was rubbed with rayon cloth to perform a rubbing treatment.

Production of Oriented Substrate E

After an aqueous solution containing 5% by weight of polyvinyl alcohol (NH-18, produced by Nippon Synthetic Chemical Industry Co., Ltd.) was applied on a triacetyl cellulose (TAC) film substrate, the aqueous solution was heated at 150° C. for 30 minutes so as to be dried to form an alignment layer. Then, the alignment layer was rubbed with rayon cloth to perform a rubbing treatment.

Example 1

The liquid crystal coating solution A was applied on the oriented substrate A by a #5 bar coater. The solution A was heated at 90° C. for 5 minutes so as to be dried and oriented. Then, the substrate A was taken out under room temperature and irradiated with UV light (metal halide lamp, 1 mJ/cm$^2$) to thereby fix the oriented liquid crystal layer. Thus, a twist-obliquely oriented film having an oriented liquid crystal layer 1.0 µm thick was obtained. A 50 µm-thick triacetyl cellulose (TAC) film having a 20 µm-thick adhesive layer made of an acrylic pressure-sensitive adhesive agent was bonded to the oriented liquid crystal layer side of the liquid crystal oriented film through the adhesive layer. Then, the twist-obliquely oriented film was separated into two at the interface between the substrate having the alignment layer and the oriented liquid crystal layer. Thus, a liquid crystal oriented film was obtained as a laminate of the TAC film, the adhesive layer and the oriented liquid crystal layer.

Example 2

Production was made in the same manner as in Example 1 except that the liquid crystal coating solution B was applied on the oriented substrate A by a #10 bar coater and fixed in the same condition as in Example 1 to thereby obtain a liquid crystal oriented film having a 2.2 µm-thick oriented liquid crystal layer. Thus, a liquid crystal oriented film was obtained as a laminate of the TAC film, the adhesive layer and the oriented liquid crystal layer.

Example 3

The liquid crystal coating solution A was applied on the oriented substrate B by a #5 bar coater and fixed in the same condition as in Example 1 to thereby obtain a liquid crystal oriented film having a 1.1 μm-thick oriented liquid crystal layer.

Example 4

The liquid crystal coating solution B was applied on the oriented substrate B by a #10 bar coater and fixed in the same condition as in Example 1 to thereby obtain a liquid crystal oriented film having a 1.9 μm-thick oriented liquid crystal layer.

Example 5

Production was made in the same manner as in Example 1 except that the liquid crystal coating solution A was applied on the oriented substrate C by a #5 bar coater and fixed in the same condition as in Example 1 to thereby obtain a liquid crystal oriented film having a 1.0 μm-thick oriented liquid crystal layer. Thus, a liquid crystal oriented film was obtained as a laminate of the TAC film, the adhesive layer and the oriented liquid crystal layer.

Example 6

Production was made in the same manner as in Example 1 except that the liquid crystal coating solution B was applied on the oriented substrate C by a #10 bar coater and fixed in the same condition as in Example 1 to thereby obtain a liquid crystal oriented film having a 2.1 μm-thick oriented liquid crystal layer. Thus, a liquid crystal oriented film was obtained as a laminate of the TAC film, the adhesive layer and the oriented liquid crystal layer.

Example 7

The liquid crystal coating solution A was applied on the oriented substrate D by a #5 bar coater and fixed in the same condition as in Example 1 to thereby obtain a liquid crystal oriented film having a 0.9 μm-thick oriented liquid crystal layer.

Example 8

The liquid crystal coating solution B was applied on the oriented substrate D by a #10 bar coater and fixed in the same condition as in Example 1 to thereby obtain a liquid crystal oriented film having a 2.0 μm-thick oriented liquid crystal layer.

Comparative Example 1

Production was made in the same manner as in Example 1 except that the liquid crystal coating solution C was applied on a PET film substrate by a #6 bar coater and fixed in the same condition as in Example 1 to thereby obtain a liquid crystal oriented film having a 2.0 μm-thick oriented liquid crystal layer. Thus, a liquid crystal oriented film was obtained as a laminate of the TAC film, the adhesive layer and the oriented liquid crystal layer.

Comparative Example 2

Production was made in the same manner as in Example 1 except that the liquid crystal coating solution A was applied on a PET film substrate by a #32 bar coater and fixed in the same condition as in Example 1 to thereby obtain a liquid crystal oriented film having a 3.2 μm-thick oriented liquid crystal layer. Thus, a liquid crystal oriented film was obtained as a laminate of the TAC film, the adhesive layer and the oriented liquid crystal layer.

Comparative Example 3

Production was made in the same manner as in Example 1 except that the liquid crystal coating solution B was applied on a PET film substrate by a #5 bar coater and fixed in the same condition as in Example 1 to thereby obtain a liquid crystal oriented film having a 2.0 μm-thick oriented liquid crystal layer. Thus, a liquid crystal oriented film was obtained as a laminate of the TAC film, the adhesive layer and the oriented liquid crystal layer.

Comparative Example 4

The liquid crystal coating solution C was applied on the oriented substrate E by a #6 bar coater and fixed in the same condition as in Example 1 to thereby obtain a liquid crystal oriented film having a 2.1 μm-thick oriented liquid crystal layer.

Comparative Example 5

The liquid crystal coating solution A was applied on the oriented substrate E by a #32 bar coater and fixed in the same condition as in Example 1 to thereby obtain a liquid crystal oriented film having a 3.4 μm-thick oriented liquid crystal layer.

Comparative Example 6

The liquid crystal coating solution B was applied on the oriented substrate E by a #5 bar coater and fixed in the same condition as in Example 1 to thereby obtain a liquid crystal oriented film having a 1.8 μm-thick oriented liquid crystal layer.

Method for Measuring the Degree of Obliquity

The values of retardation in the liquid crystal oriented film produced by each of Examples and Comparative Examples were measured by an automatic birefringence meter (KOBRA21ADH, manufactured by Oji Scientific Instruments). That is, the value in the frontal direction and the values when the film was inclined at ±30° in the direction of the slow axis were measured. The degree of obliquity was calculated on the basis of the values of retardation by the following equation:

$$\text{Degree of obliquity} = (|\Delta nd(-30) - \Delta nd(+30)| / \Delta nd(0)) \times 100$$

(in which $\Delta nd(0)$ is the value of retardation in the frontal direction, $\Delta nd(+30)$ and $\Delta nd(-30)$ are the values of retardation in a direction inclined at ±30° toward the slow axis, respectively).

Method for Measuring Angle of Orientation

The angle of orientation of the liquid crystal oriented film produced was measured by an automatic birefringence meter (KOBRA21ADH, manufactured by Oji Scientific Instruments). The term "angle of orientation" means the angle of the slow axis on condition that the rubbing direction or the direction of the slow axis of the polymer film substrate is regarded as 0°.

Results of evaluation of Examples and Comparative Examples are shown in Table 1.

TABLE 1

|  | State of Orientation | $\Delta nd(-30)$ | $\Delta nd(0)$ | $\Delta nd(+30)$ | Degree of obliquity | Angle of Orientation [°] |
|---|---|---|---|---|---|---|
| Example 1 | Twist + Oblique | 114 | 84 | 53 | 73 | 44 |
| Example 2 | Twist + Oblique | 178 | 124 | 77 | 81 | 73 |
| Example 3 | Twist + Oblique | 202 | 145 | 90 | 77 | 68 |
| Example 4 | Twist + Oblique | 110 | 79 | 58 | 66 | 47 |
| Example 5 | Twist + Oblique | 182 | 129 | 74 | 84 | 72 |
| Example 6 | Twist + Oblique | 192 | 140 | 94 | 70 | 70 |
| Example 7 | Twist + Oblique | 112 | 81 | 51 | 75 | 41 |
| Example 8 | Twist + Oblique | 118 | 88 | 56 | 70 | 45 |
| Comparative Example 1 | Horizontal | 66 | 71 | 66 | 0 | 0 |
| Comparative Example 2 | Twist | 133 | 158 | 130 | 2 | 46 |
| Comparative Example 3 | Twist | 148 | 162 | 147 | 1 | 29 |
| Comparative Example 4 | Horizontal | 71 | 78 | 70 | 1 | 0 |
| Comparative Example 5 | Twist | 136 | 150 | 136 | 0 | 53 |
| Comparative Example 6 | Twist | 158 | 169 | 157 | 1 | 21 |

As is seen from results shown in Table 1, when an alignment layer containing a glassy macromolecule or a silane coupling agent is formed on a substrate and rubbed and then a liquid crystal coating solution containing a chiral agent and a photopolymerizable liquid crystal composition is applied on the alignment layer, a twist-obliquely oriented liquid crystal layer having both inclined orientation and spirally twisted orientation can be obtained. In the twist-obliquely oriented film having the twist-obliquely oriented liquid crystal layer, it is proved that the degree of obliquity of the oriented liquid crystal layer obtained is higher than that of a conventional one.

Incidentally, this application is based on Japanese Patent Application (Patent Application No. 2003-060540) filed on Mar. 6, 2003 and Japanese Patent Application (Patent Application No. 2004-058943) filed on Mar. 3, 2004, and the contents thereof are incorporated herein by reference.

What is claimed is:

1. A method for producing a twist-obliquely oriented film, comprising:
   providing a substrate made of a transparent polymer;
   applying metal alkoxide on the substrate;
   heating the substrate to form a transparent glassy macromolecule thereby forming an alignment layer, on the substrate, containing the glassy macromolecule;
   performing a rubbing treatment on the alignment layer; and
   applying a liquid crystal coating solution containing a chiral agent and a photopolymerizable liquid crystal composition on the substrate so as to form a twist-obliquely oriented liquid crystal layer to form the twist-obliquely oriented film,
   wherein the twist-obliquely oriented film has:
   an angle of orientation that is not smaller than 1° and is smaller than 180°; and a degree of obliquity that is 30 or more, provided that the degree of obliquity is calculated as $$(|\Delta nd(-30) - \Delta nd(+30)|/\Delta nd(0)) \times 100$$

wherein $\Delta nd(0)$ is a retardation in a frontal direction, and $\Delta nd(+30)$ and $\Delta nd(-30)$ are each a corresponding retardation in a direction inclined at ±30° toward a slow axis, respectively.

2. The method for producing a twist-obliquely oriented film according to claim 1, which further comprises:
   sticking the twist-obliquely oriented liquid crystal layer of the twist-obliquely oriented film to an optical film through at least one adhesive layer; and
   removing the alignment layer and the substrate.

3. A twist-obliquely oriented film according to claim 1, wherein the angle of orientation is 20° to 90°.

4. The twist-obliquely oriented film according to claim 3, wherein the angle of orientation is 35° to 75°.

5. A twist-obliquely oriented film according to claim 1, wherein the degree of obliquity is 30 to 500.

6. The twist-obliquely oriented film according to claim 5, wherein the degree of obliquity is 50 to 300.

7. A twist-obliquely oriented film according to claim 1, wherein an oblique angle of a nematic liquid crystal molecule of the twist-obliquely oriented liquid crystal layer is 1° to 85° with respect to the direction normal to a surface of the substrate.

8. An optical film obtained by laminating at least one optical layer on a twist-obliquely oriented film according to claim 1.

9. An image display device having an optical film according to claim 8.

10. An image display device having a twist-obliquely oriented film according to claim 1.

11. The method for producing a twist-obliquely oriented film according to claim 1, wherein the glassy macromolecule comprises metal silicon alkoxide.

* * * * *